United States Patent [19]
Takenaka

[11] Patent Number: 5,105,458
[45] Date of Patent: Apr. 14, 1992

[54] MOBILE TELEPHONE SYSTEM HAVING MESSAGE RECORDING MODE DURING FAILURES

[75] Inventor: Hidetoshi Takenaka, Tokyo, Japan

[73] Assignee: NEC Corporation, Tokyo, Japan

[21] Appl. No.: 563,387

[22] Filed: Aug. 7, 1990

[30] Foreign Application Priority Data

Aug. 7, 1989 [JP] Japan ............................ 1-204160
Aug. 11, 1989 [JP] Japan ............................ 1-206702

[51] Int. Cl.⁵ .................................... H04M 11/00
[52] U.S. Cl. .................................... 379/58; 379/67
[58] Field of Search ............... 379/58, 60, 61, 63, 379/67, 59, 88

[56] References Cited

U.S. PATENT DOCUMENTS

| | | | |
|---|---|---|---|
| Re. 33,507 | 12/1990 | Hashimoto | 379/61 |
| 4,881,259 | 11/1989 | Scordato | 379/67 |
| 4,903,291 | 2/1990 | Tsurufuji et al. | 379/88 |
| 4,920,557 | 4/1990 | Umemoto | 379/67 |
| 4,941,203 | 7/1990 | Patsiokas et al. | 379/67 |
| 4,977,589 | 12/1990 | Johnson et al. | 379/88 |

Primary Examiner—James L. Dwyer
Assistant Examiner—Dwayne D. Bost
Attorney, Agent, or Firm—Sughrue, Mion, Zinn, Macpeak & Seas

[57] ABSTRACT

In a mobile telephone system, a base station establishes a radio link to a mobile station and a connection to a swtiched telephone network when the mobile station is in communication with a network-side station. The base station constantly monitors signals from the mobile station over the radio link. If it detects that the radio link is failing during a communication, an announcement is transmitted to the network-side station. A recording/playback apparatus is then operated to record a message from the network-side station. The base station further includes a ringing detector for detecting a ringing signal from the network when an incoming call is received from a network station. A connection is then established between the calling station and the base station if it fails to access the mobile station. An announcement is then transmitted to the network and the recording/playback apparatus is operated to record a message from the calling station.

24 Claims, 5 Drawing Sheets

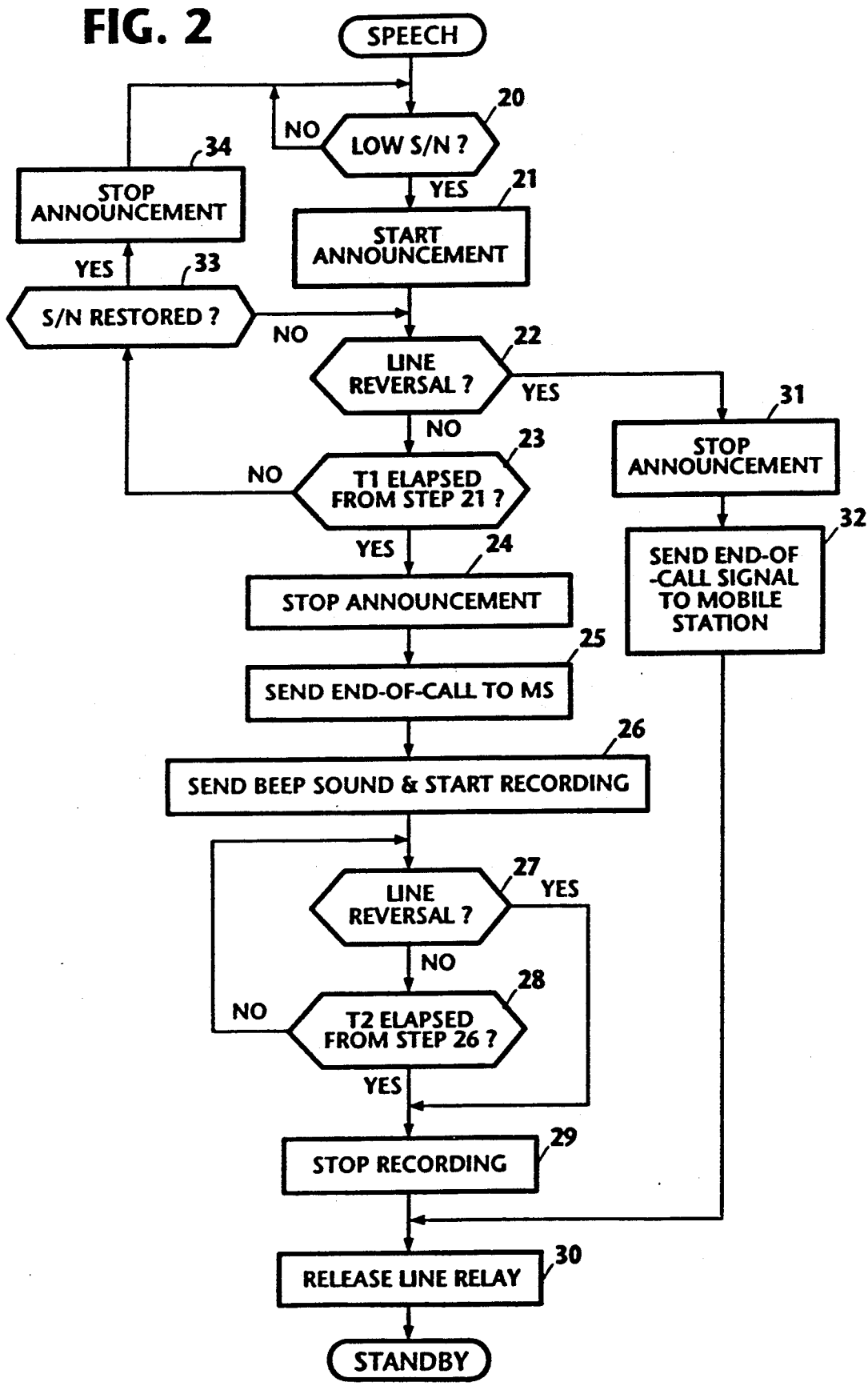

MOBILE TELEPHONE SYSTEM HAVING MESSAGE RECORDING MODE DURING FAILURES

BACKGROUND OF THE INVENTION

The present invention relates to a mobile telephone system.

With a conventional mobile telephone system which is connected to a public switched telephone network, the signal-to-noise ratio of the signals on a radio channel from a mobile station is constantly monitored by a base station. If it falls below a prescribed level, a line-hold tone is sent to the network. If this condition terminates within a specified period, the line-hold tone is removed to allow both parties to resume the communication. Should it continue beyond the specified period, the connection between the base station and the network is forcibly cleared and an end-of-call signal is sent to the mobile station to clear the radio channel. If this forced disconnection occurs as a result of the mobile station user inadvertently passing beyond the boundary of the system's service area, it is likely that he will recognize the situation, but the network-side user may be left puzzling over the disconnection.

In addition, when there is an incoming call from a network-side user, the base station is alerted by a ringing signal and proceeds to establish a connection between the network and the mobile station. If it fails in this attempt, the call-originating user is left unanswered for an extended period of time.

SUMMARY OF THE INVENTION

It is therefore an object of the present invention to ensure against possible failures which are likely to be encountered with a mobile telephone system by allowing network-side station users to leave their messages in a recording apparatus in the event of a failure.

According to one aspect of the present invention, there is provided a mobile telephone system comprising a base station for establishing a radio link to a mobile station and a connection to a switched telephone network when the mobile station is in communication with a network-side station. The base station comprises a detector circuit for monitoring signals from the mobile station to detect that the radio link between the base and mobile stations is failing during a communication. This fact is then communicated to the network-side station in the form of an announcement. A recording/playback apparatus is then operated to record a message from the network-side station.

According to a second aspect of this invention, the base station comprises a ringing detector for detecting a ringing signal from the network. A control circuit is responsive to this ringing signal for establishing a connection to the network if the base station fails to access the mobile station. This fact is then communicated to the network-side station in the form of an announcement to allow the distant station to record a message in the recording/playback apparatus.

BRIEF DESCRIPTION OF THE DRAWINGS

The present invention will be described in further detail with reference to the accompanying drawings, in which:

FIG. 2 is a flowchart describing the operation of the controller of FIG. 1 according to a first embodiment of the present invention;

DETAILED DESCRIPTION

Figure 1:
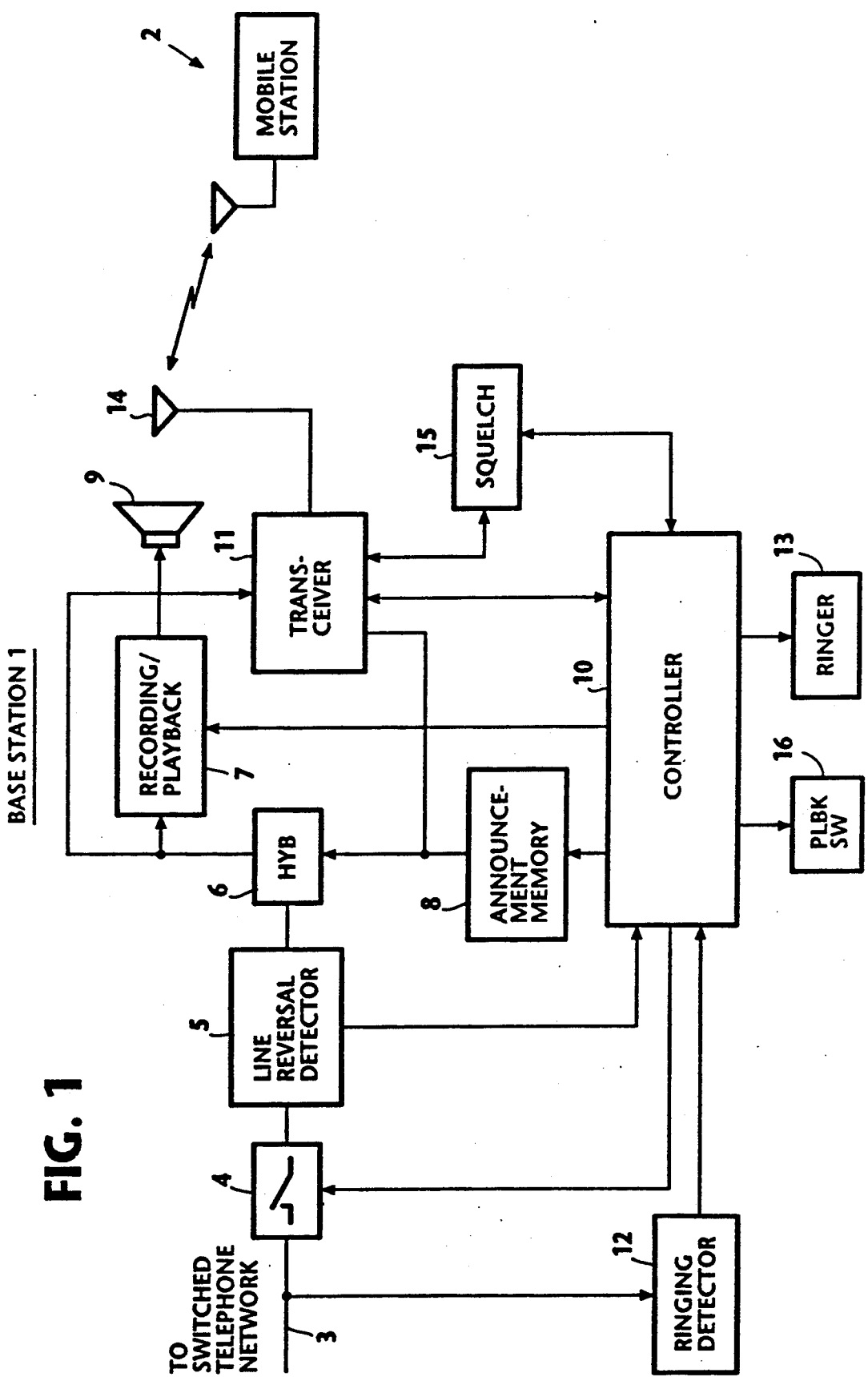
FIG. 1 is a block diagram of a mobile telephone system of the present invention.

Referring now to FIG. 1, there is shown a mobile telephone system embodying the present invention. The system of this invention is made up of a base station 1 and a portable telephone, or mobile station 2. Base station 1 is connected to the public switched telephone network through an exchange line 3 to receive incoming calls from the network or send dialing signals to the network when originating a call. Base station 1 includes a line relay 4 to connect the exchange line 3 through a line reversal detector 5 to a two-wire/four-wire conversion circuit, or hybrid 6 in order to establish a DC loop to the corresponding line terminal of the network when the mobile station goes off hook in response to an incoming call, or when originating a call. Line reversal detector 5 is provided to detect a change in polarity that usually occurs on line 3 when a distant called station on the other side of the network goes off hook in response to a call, or when a distant station goes on hook at the end of a call. The two-wire receive portion of hybrid 6 is coupled to the transmit section of a radio transceiver 11 and to a recording/playback apparatus 7. The two-wire transmit portion of hybrid 6 receives inputs from the receive section of transceiver 11 and from the output of an announcement memory 8.

A loudspeaker 9 is connected to the output of recording/playback apparatus 7 to receive a message recorded in the apparatus. From an antenna 14, transceiver 11 establishes a two-way control channel with the mobile station for exchanging control signals and a two-way speech channel for carrying speech signals during a communication. Base station 1 further includes a ringing detector 12 which is connected to the exchange line 3 to detect a ringing signal that is sent from the network in response to receipt of an incoming call and communicates this fact to a microprocessor-based controller 10.

Controller 10 is also connected to the output of line reversal detector 5 and transceiver 11 to control the operations of line relay 4, announcement memory 8 and to a ringer 13, and exchange control signals with mobile stations 2 by way of transceiver 11 in a manner as will be described with reference to FIGS. 2 to 4. A squelch circuit 15 is connected between controller 10 and transceiver 11 to produce a signal indicative of the signal-to-noise ratio of a speech channel, and hence, the field intensity of signals from the mobile station, and to suppress the noise generated therein.

According to a first embodiment of this invention, controller 10 is programmed as shown in FIG. 2. Program execution starts with decision step 20 which monitors the output of squelch circuit 15 and checks to see if the signal-to-noise ratio of the signal from the mobile station is lower than a prescribed value. If the mobile station is in communication with a distant station on the other side of the switched network through a dial-up connection, the line relay 4 of the base station is operated, coupling the exchange line to hybrid 6 and forming a DC loop to the corresponding line terminal of the network. Assuming that the mobile station user is moving out of the service area of the system, squelch circuit 15 will produce a low S/N signal, and control exits to step 21 to activate the announcement memory 8 to give a stored vocal announcement to the distant station indicating that the speech channel is now failing and a recording apparatus will be in a record mode for a short period of time immediately following a "beep" sound, urging him to leave a message. Exit then is to decision step 22 which checks to see if the exchange line is reversed in polarity due to on-hook of the distant station.

If the distant station hears the announcement and goes on hook without leaving a message, the answer will be affirmative in step 22 and control moves ahead to step 31 to deactivate memory 8 to stop the announcement, goes to step 32 to send an end-of-call signal to the mobile station to cause the user to go on hook, and then to step 30 to release the line relay 4 to clear the dial-up connection to the network. If the distant network-side station continues hearing the announcement, the answer is negative in step 22 and control proceeds to step 23 to determine if a timeout period T1 from the time the vocal announcement is given has elapsed. If the answer is negative, exit from step 23 is to step 33 to check to see if the signal-to-noise ratio of the speech channel has restored to normal. If the signal-to-noise ratio is still lower than normal, steps 22 and 23 are repeated until timeout period T1 is reached; otherwise announcement memory 8 is deactivated (step 34), with control returning to the starting point of the program.

Exit from step 23 following the affirmative decision thereof is to step 24 to deactivate memory 8, and control goes to step 25 to send an end-of-call signal to the mobile station to cause the user to go on hook. Exit is to step 26 to send a beep sound to the network to urge the distant station to leave a short message, and to simultaneously activate recording/playback apparatus 7 so that it is ready to record the message.

Control now advances to step 27 to check for a line reversal and then to step 28 to determine if timeout period T2 from the instant the recording apparatus 7 is activated by step 26 has elapsed. If the distant station is leaving a message, control will make a repeated pass through steps 27 and 28 until timeout period T2 has elapsed, whereupon control exits to step 29 to deactivate recording/playback apparatus 7. Exit then is to step 30 to clear the dial-up connection. If the distant station goes on hook, leaving no message, the answer in decision step 27 will be affirmative and control executes steps 29 and 30.

A playback switch 16 is connected to controller 10. When this switch is operated later by the mobile station user, controller 10 operates recording/playback apparatus 7 in a playback mode to search for a recorded message and play it back through loudspeaker 9.

Figure 3A:
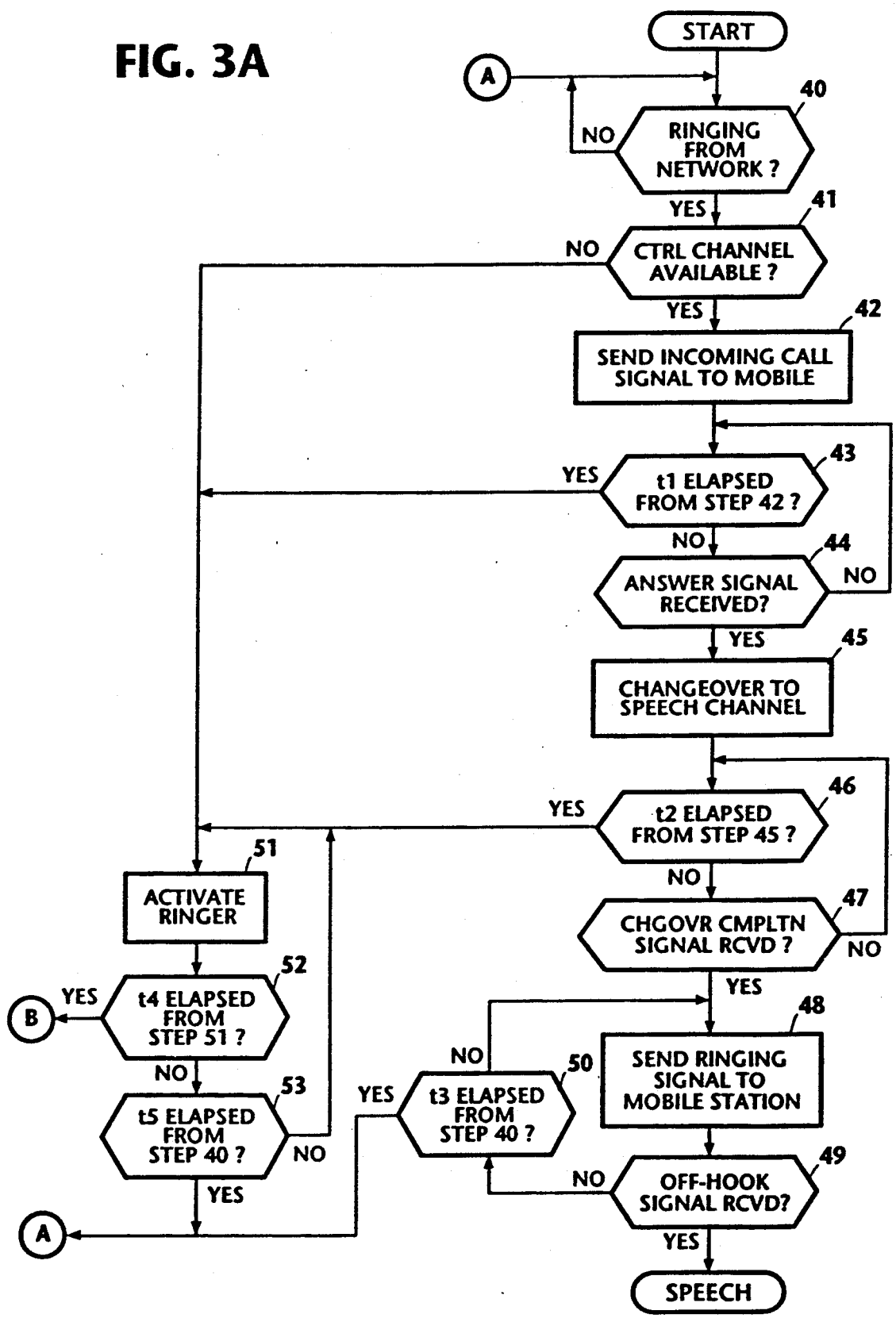
FIGS. 3A and 3B are flowcharts of the controller of FIG. 1 according to a second embodiment of this invention.
Figure 3B:
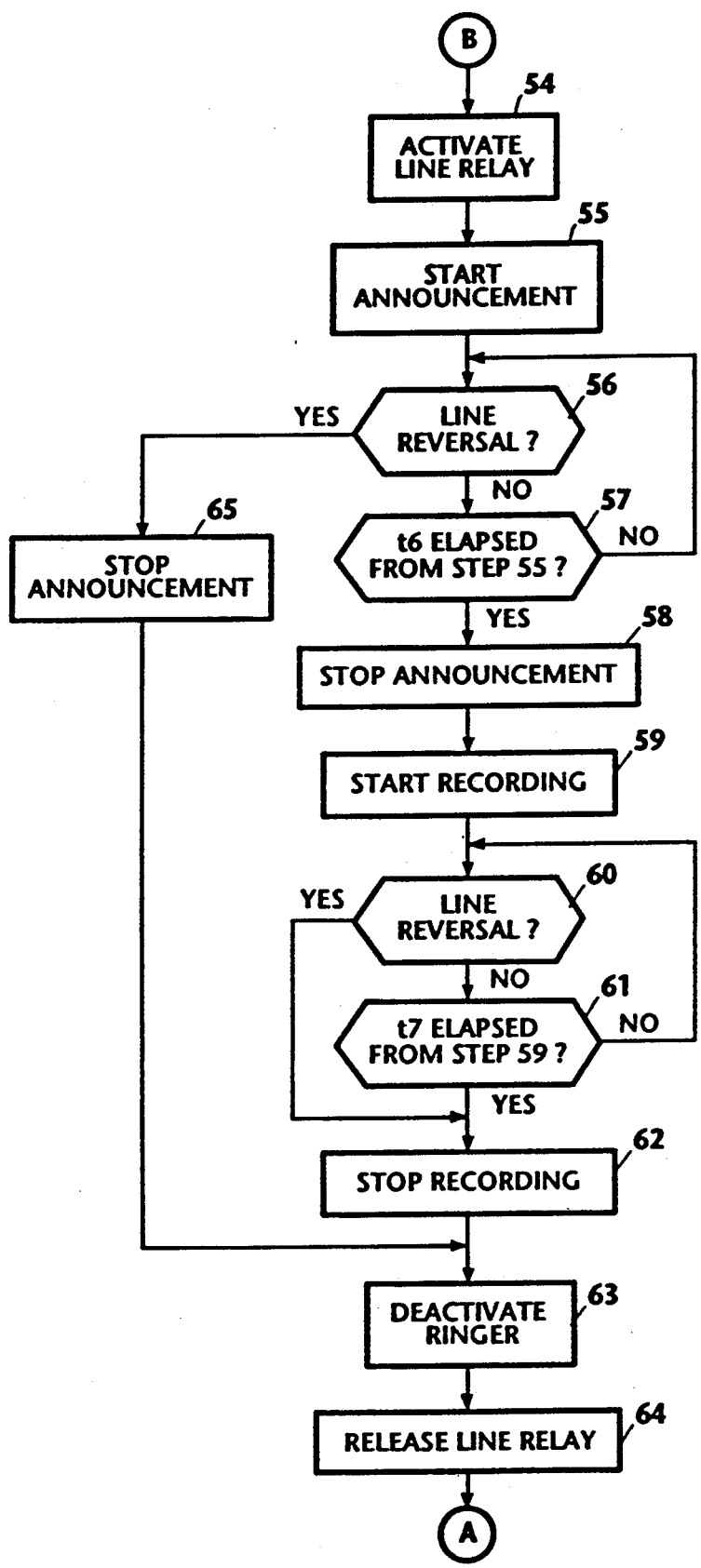
Figure 4:
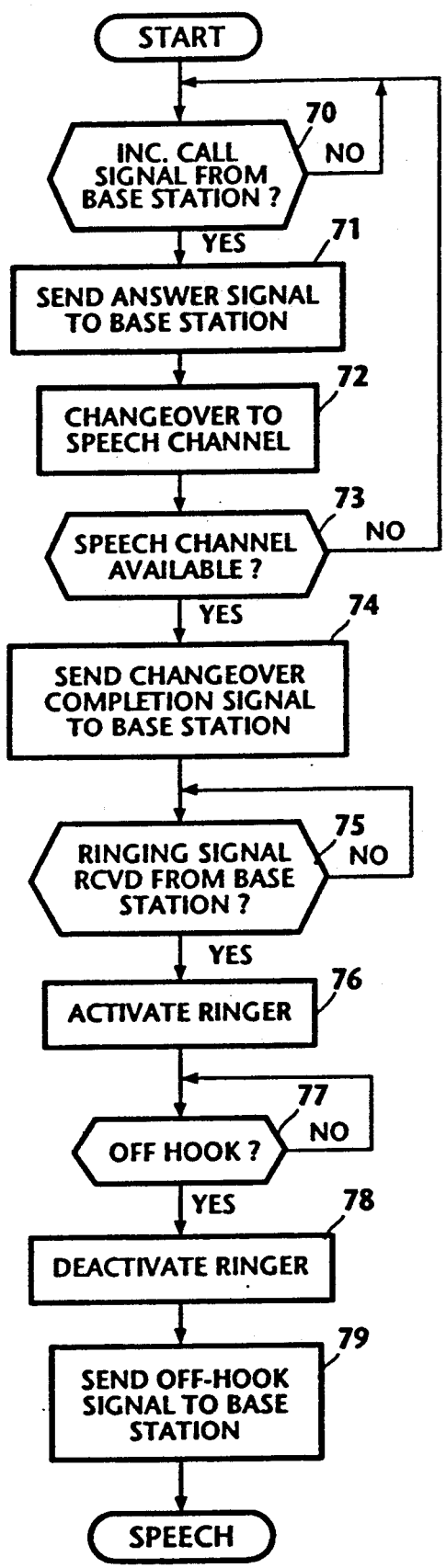
FIG. 4 is a flowchart describing the operation of the mobile station of FIG. 1 according to the second embodiment.

According to a second embodiment of this invention, base-station controller 10 is programmed as shown in FIGS. 3A and 3B and mobile station 2 is programmed as shown in FIG. 4. The program of controller 10 starts with decision step 40 which checks to see if a ringing signal from the network is detected by ringing detector 12. If this is the case, control proceeds to step 41. If the control channel of the system is idle, control exits to step 42 to send an incoming-call signal over the control channel on which the mobile station may be in a standby state to receive or originate calls. If the mobile station is in the process of seizing an idle speech channel to establish a dial-up connection through the network, contention may arise between the base and mobile stations to use the control channel. In such instances, the answer in decision step 41 may be negative and control proceeds to step 51 to activate the ringer 13 at base station 1.

In response to the incoming-call signal (step 70, FIG. 4), the mobile station returns an answer signal to base station 1 (step 71) and goes to step 72 to switch its control circuit over to the speech channel. Control goes to step 73 to check to see if this speech channel is available. If the answer is negative, control returns to the beginning of the program. Otherwise, exit is to step 74 to transmit a changeover completion signal to the base station.

Returning to FIG. 3A, base station 1 is in a process executing steps 43 and 44 to check the amount of time elapsed from the time the incoming-call signal is transmitted by step 42 and check for reception of the answer signal returned from the mobile station. If the answer signal is received within a time interval t1 set by step 43, control moves ahead to step 45 to switch the transceiver 11 to the speech channel. Control now exits to steps 46 and 47 to check for the time interval elapsed from the instant the transceiver is switched over to the speech channel by step 45 and subsequently check for the reception of the changeover completion signal from the mobile station. If this signal is received within a timeout period t2 (step 46) from the execution of step 45, control advances to step 48 to send a ringing signal to the mobile station, and goes to step 49 to monitor the reception of an off-hook signal from the mobile station.

On receiving this ringing signal (step 75, FIG. 4), the mobile station activates its ringer, not shown, (step 76) to alert the mobile station user. If the mobile station goes off hook (step 77), the ringer is deactivated (step 78) and an off-hook signal is sent to the base station (step 79).

If this off-hook signal is not received within a timeout period t3 (step 50) counted from the instant the ringing signal is received in step 40, the same ringing signal is repeatedly sent to the mobile station. On receiving an off-hook signal within the interval t3 from the mobile station, control at base station 1 establishes a speech path by activating the line relay 4.

Assuming that the control channel is not available (step 41), or timeout period t1 or t2 has elapsed, control exits to step 51 to activate the ringer 13 and executes timeout steps 52 and 53 to reactivate the ringer 13. Steps 52 and 53 respectively establish a timeout period t4 from the instant ringer 13 is activated and a timeout period t5 from the instant a ringing signal is detected by step 40. Ringer 13 is thus activated until whichever earlier of the two timeout periods t4 and t5 is reached. If period t5 has elapsed (step 53), control returns to the beginning of the program, and if period t4 has elapsed (step 52), control moves ahead to step 54 (FIG. 3B) to activate the line relay 4 to set up a connection to the network, and goes to step 55 to activate memory 8 to send a vocal announcement to the distant calling station indicating that the base station has failed to establish a speech path and a recording apparatus will be in a record mode immediately following a beep sound, allowing the calling station to leave any message. Following step 55, steps 56 and 57 are sequentially executed to ascertain that the distant calling station stage in the off-hook condition for at least a specified timeout period t6 that is counted from the instant step 55 is executed. If the calling station goes on hook within the interval t6, control exits to step 65 to deactivate announcement memory 8 and goes to step 63 to deactivate ringer 13 and release the line relay 5 (step 64) to clear the connection.

If the distant calling station holds the off-hook condition for period t6, control advances to step 58 to deactivate the announcement memory 8 and goes to step 59 to activate the recording/playback apparatus 7 in a record mode. Steps 60 and 61, respectively similar to steps 56 and 57, are sequentially executed to ascertain that the distant calling station stays off-hook for a specified timeout period t7 that is counted from the instant step 59 is executed. If the calling station goes on hook or timeout period t7 has elapsed, control exits to step 62 to deactivate the recording/playback apparatus 7 and goes to step 63 to deactivate ringer 13 and release the line relay 4 (step 64) to clear the connection.

The user of the mobile station is alerted by the activated ringer 13 and operates the playback switch 16 to playback a message which may be recorded.

The foregoing description shows only preferred embodiments of the present invention. Various modifications are apparent to those skilled in the art without departing from the scope of the present invention which is only limited by the appended claims. Therefore, the embodiments shown and described are only illustrative, not restrictive.

What is claimed is:

1. A mobile telephone system comprising a base station for establishing a radio link to a mobile station and a connection to a switched telephone network when said mobile station is in communication with a network-side station, the base station comprising:
    detector means for continuously monitoring signals on said radio link from said mobile station to detect whether said radio link is failing during a communication;
    announcement generating means for transmitting an announcement to said network-side station in response to the detection of a failing radio link by said detector means, so that the fact that a radio link is failing is communicated to the network-side station; and
    recording/playback means for recording a message from said network-side station following the transmission of said prerecorded announcement.

2. A mobile telephone system as claimed in claim 1, further comprising means for terminating the transmission of said announcement when said radio link has recovered during the transmission of said announcement.

3. A mobile telephone system as claimed in claim 1, further comprising:
    means for detecting a ringing signal from said network; and means responsive to the detected ringing signal for determining whether access to said mobile station is available or not, causing said announcement generating means to transmit an announcement to said network if access is determined to be not available, so that the fact that the mobile station is not accessible is communicated to the network-side station, and causing a message from said network-side station to be recorded into said recording/playback means following the transmission of the last-mentioned announcement.

4. A mobile telephone system as claimed in claim 1, further comprising:
    means for detecting a line reversal in a transmission line between said network and said base station; and
    means for terminating the transmission of said announcement in response to the detection of said line reversal and clearing said connection between said base station and said network.

5. A mobile telephone system as claimed in claim 4, further comprising means for disabling said recording/playback means in response to the detection of said line reversal and clearing said connection.

6. A communication method for a mobile telephone system comprising a base station for establishing a radio link to a mobile station and a connection to a switched telephone network when said mobile station is in communication with a network-side station, comprising the sequential steps of:
    a) continuously monitoring signals from said mobile station at said base station to determine whether said radio link is falling during a communication;
    b) if said radio link is determined to be failing, transmitting an announcement to said network, so that the fact that a radio link is failing is communicated to the network-side station; and
    c) recording a message from said network-side station.

7. A communication method as claimed in claim 6, wherein step (a) terminates the transmission of said announcement when said radio link has recovered during the transmission of said announcement.

8. A communication method as claimed in claim 6, wherein step (b) comprises the sequential steps of detecting a line reversal in a transmission line between said network and said base station, terminating the transmission of said announcement, and clearing the connection between said base station and said network.

9. A communication method as claimed in claim 6, wherein step (c) comprises the sequential steps of detecting a line reversal in a transmission line between said network and said base station and clearing the connection between said network and said base station.

10. communication method as claimed in claim 6, further comprising the sequential steps of:
    detecting a ringing signal from said network;
    determining whether access to said mobile station is available or not;
    if said access is determined to be not available, establishing a connection between said network and said base station;
    transmitting an announcement to said network through said connection; and
    recording a message from said network-side station.

11. A mobile telephone system comprising a base station for establishing a radio link to a mobile station and a connection to a switched telephone network when said mobile station is in communication with a network-side station, wherein said radio link includes a control channel and a speech channel, said base station comprising:
    detector means for detecting a ringing signal from said network;
    control means responsive to the detected ringing signal for making a decision as to whether said control channel is available and establishing said connection between the base station and said network in response to a decision that said control channel is not available or transmitting an incoming call signal through said control channel to the mobile station in response to a decision that said control channel is available;

announcement generating means responsive to said decision that said control channel is not available for transmitting an announcement to said network-said station through said connection, so that the fact that the mobile station is not accessible is communicated to the network-side station; and recording/playback means for recording a message from said network-side station following the transmission of said announcement.

12. A mobile telephone system as claimed in claim 11, wherein said base station further comprises a ringer, wherein said control means activates said ringer in response to either a decision that said control channel is not available or a decision that said answer has not been received.

13. A mobile telephone system as claimed in claim 11, further comprising:
means for detecting a line reversal in a transmission line between said network and said base station; and
means for terminating the transmission of said announcement in response to the detection of said line reversal and clearing said connection between said base station and said network.

14. A mobile telephone system as claimed in claim 13, further comprising means for disabling said recording/playback means in response to the detection of said line reversal and clearing said connection between said base station and said network.

15. A mobile telephone system as claimed in claim 11, wherein said control means makes a further decision as to whether an answer signal is received from said mobile station within a specified period in response to said incoming call signal and establishing a connection to the network, said announcement generating means being responsive to said further decision for transmitting said announcement to said network-side station when said answer signal has not been received.

16. A mobile telephone system as claimed in claim 15, wherein said control means transmits a channel changeover command signal through said control channel to said mobile station if said answer signal is received within said specified period to cause said mobile station to switch from said control channel to said speech channel, and makes a further decision as to whether a changeover completion signal is received from said mobile station within a specified period in response to said changeover command signal.

17. A mobile telephone system as claimed in claim 15, wherein said base station further comprises a ringer, wherein said control means activates said ringer in response to either a decision that said control channel is not available or a decision that said answer has not been received.

18. A communication method for a mobile telephone system comprising a base station connected to a switched telephone network for establishing a radio link between said network and a mobile station, said radio link including a control channel and a speech channel, comprising the sequential steps of: .
a) detecting a ringing signal from said network;
b) making a first decision as to whether said control channel is available or not;
c) if said control channel is not available, establishing a connection between said network and said base station;
d) transmitting an announcement to said network through said connection, so that the fact that the mobile station is not accessible is communicated to the network-side station;
e) recording a message from said network-side station; and
f) if said control channel is available, transmitting an incoming call signal to said mobile station through said control channel.

19. A communication method as claimed in claim 18, further comprising alerting the user of said system from the site of said base station in response to any of said decisions that said control channel is not available, that said answer signal is not received and that said changeover completion signal is not received.

20. A communication method as claimed in claim 18, wherein wach of steps (c) and (d) comprises the sequential steps of:
detecting a line reversal in a transmission line between said network and said base station; and
clearing said connection between said base station and said network.

21. A communication method as claimed in claim 18, further comprising the steps of:
making a decision as to whether an answer signal is received from said mobile station within a specified period in response to said incoming call signal;
if said answer signal is not received, establishing a connection between the network and the base station;
transmitting an announcement to said network-side station, so that the fact that the mobile station is not accessible is communicated to the network-said station; and
recording a message from the network-side station.

22. A communication method as claimed in claim 21, further comprising alerting the user of said system from the site of said base station in response to any of said decisions that said control channel is not available, that said answer signal is not received and that said changeover completion signal is not received.

23. A communication method as claimed in clam 21, wherein the step (b) comprises the sequential steps of transmitting a channel changeover command signal through said control channel to said mobile station if said answer signal is received from said mobile station within said specified period to cause said mobile station to switch from said control channel to said speech channel, and makes said determination if a chageover completion signal is not received from said mobile station within a specified period in response to said changeover command signal.

24. A communication method as claimed in claim 23, further comprising alerting the user of said system from the site of said base station in response to any of said decisions that said control channel is not available, that said answer signal is not received and that said changeover completion signal is not received.

* * * * *